3,406,004
REACTION OF POLYMERIC MATERIALS CONTAINING ACTIVE HYDROGEN WITH FLUORO-ALKYL VINYL SULFONES
Giuliana C. Tesoro, Dobbs Ferry, N.Y., and Richard N. Ring, Wood-Ridge, N.J., assignors to J. P. Stevens & Co., Inc., New York, N.Y., a corporation of Delaware
No Drawing. Original application Aug. 30, 1963, Ser. No. 305,812, now Patent No. 3,335,163. Divided and this application Sept. 2, 1966, Ser. No. 615,859
14 Claims. (Cl. 8—115.5)

The present application is a divisional of application Ser. No. 305,812, filed Aug. 30, 1963, now U.S. Patent No. 3,335,163.

The present invention relates to novel reactive organic compounds containing both fluorine and sulfur, methods for their preparation and polymers thereof. More particularly, the present invention relates to novel fluoroalkyl sulfur-containing compounds, and olefinic and saturated derivatives thereof. The present invention further relates to methods for modifying active hydrogen-containing polymeric materials with novel fluoro-alkyl sulfur-containing compounds.

The novel compounds of this invention are useful as reactants for polymer modification, as surface treating and coating agents, as textile finishing agents, as water and oil repellents for fabrics, as monomers and comonomers in polymerization reactions as intermediates for chemical synthesis, and for other purposes.

The structure of the novel compounds of the present invention is characterized by the presence in the molecule of a covalently bonded fluorocarbon portion that is both hydrophobic and oleophobic.

It is an object of this invention to provide a group of novel organic compounds containing both fluorine and sulfur.

It is another object of the invention to provide new and useful fluoroalkyl sulfides, sulfoxides, sulfones and sulfonic acid esters.

It is another object of this invention to provide new and useful olefinic unsaturated derivatives of fluoroalkyl sulfides, sulfoxides, sulfones and fluoroalkyl esters of vinyl sulfonic acid.

It is another object of the present invention to provide new and useful reactive saturated derivatives of the fluoroalkyl vinyl compounds.

It is another object of the present invention to provide new and useful organic fluorine-containing compounds possessing a reactive vinyl sulfonyl group and a covalently bonded fluorocarbon moiety that is hydrophobic and oleophobic, and saturated derivatives of said compounds.

It is another object of this invention to provide methods for the preparation of a group of novel organic compounds containing both fluorine and sulfur.

It is another object of the present invention to provide a method for imparting desirable properties to active-hydrogen containing polymeric materials, by treating with a group of novel organic compounds containing both fluorine and sulfur, and the products produced thereby.

It is another object of the present invention to provide a method of imparting hydrophobic and oleophobic properties to cellulosic textile materials.

It is a further object of this invention to provide cellulosic textile materials which are modified to impart desirable properties thereto by treatment with a group of novel organic compounds containing both fluorine and sulfur.

It is a still further object of the present invention to provide novel polymers of fluoro-alkyl sulfur-containing compounds.

In attaining the above objects, one feature of the present invention resides in the fluoro-alkyl compounds containing a reactive group capable of functioning in several ways, depending on the reaction system employed.

Another feature of the present invention resides in the fluoro-alkyl sulfur-containing compounds that are capable of generating a reactive group under proper reaction conditions.

Another feature of the present invention resides in reacting the active hydrogen atoms of a polymeric material with the fluoro-alkyl sulfur-containing compounds to obtain a chemically modified polymeric product.

Other features and objects of the present invention will become apparent from the detailed description and examples which follow hereinafter below.

The novel fluoro-alkyl sulfur-containing compounds of the present invention can be represented by the following structural generic formula:

(I)     $R_fCH_2O(CH_2)_nS[O]_bQ$ wherein Q is a reactive monovalent aliphatic radical containing at least two carbon atoms, $R_f$ is a fluoro-alkyl group containing from 3 to 14 carbon atoms, where the hydrogen atoms of at least two carbon atoms in said group are completely substituted by fluorine, $n$ is an integer with a value of 0 to 2 and $b$ has a value of 0 to 2 but when $n$ is equal to 0 then $b$ has a value of 2.

Included in Formula I above are compounds containing terminal olefinic unsaturation, i.e. a vinyl group. These compounds can be represented by the following general structural formula:

(II)     $R_fCH_2O(CH_2)_nS[O]_bCH=CH_2$ where $R_f$ is a fluoro alkyl group containing at least 3 carbon atoms, where the hydrogen atoms of at least two carbon atoms in said group are completely substituted by fluorine, $n$ is an integer with a value of from 0 to 2, and $b$ is an integer with a value from 0 to 2 but when $n$ has a value of 0, then $b$ has a value of 2. Compounds as above wherein $b$ is 2, i.e. vinyl sulfonyl compounds are preferred. In addition, compounds as above wherein $R_f$ is a fluoro alkyl group containing at least 5 and up to 14 carbon atoms are preferred, while compounds containing at least 8 carbon atoms are most preferred.

Further novel compounds of the present invention are saturated derivatives of the fluoro-alkyl sulfur-containing compounds of Formula II. These novel compounds are fluoro-alkyl-beta substituted compounds and can be represented by the general structural formula:

(III)     $R_fCH_2O(CH_2)_nS[O]_bCH_2CH_2Y$ wherein $R_f$ is a fluoro-alkyl group containing from 3 to 14 carbon atoms where the hydrogen atoms of at least two carbon atoms in said group are completely substituted by fluorine, $n$ is an integer with a value of from 0 to 2, $b$ is an integer with a value of 0 to 2, but when $n$ has a value of 0, then $b$ has a value of 2, and Y is selected from the group consisting of a potentially anionic nucleophilic group and a potentially neutral nucleophilic group.

Potentially anionic nucleophilic groups include but are not limited to: hydroxyl, lower alkoxy,

—OCOR, —OSO$_3$M, —SSO$_3$M wherein M is an alkali metal cation such as sodium, potassium or ammonium; N(R)$_2$, Cl, Br, I, F, and wherein R is a lower alkyl radical, e.g. 1 to 5 carbon atoms. Potentially neutral nucleophilic groups include but are not limited to:

—$\overset{+}{S}R_2$ and $\overset{+}{N}C_5H_5$ together with a neutralizing anion, such as Cl⁻.

The corresponding compounds containing terminal unsaturation can be generated from the above saturated derivatives under suitable conditions, as illustrated by the equation:

$$R_fCH_2O(CH_2)_nSO_2CH_2CH_2Y$$
$$\rightarrow R_fCH_2O(CH_2)_nSO_2CH=CH_2+HY$$

wherein all terms have the same meaning as above. The reaction illustrated above takes place in the presence of a catalyst and when the liberated compound HY is an acid, an acid acceptor compound is necessary.

Specific examples of the novel compounds of the present invention include but are not limited to:

$$CH_2=CHSO_2CH_2CH_2OCH_2(CF_2)_9CF_2H$$
$$CH_2=CHSO_2CH_2CH_2OCH_2(CF_2)_7CF_2H$$
$$CH_2=CHSO_2OCH_2(CF_2)_9CF_2H$$
$$CH_2=CHSCH_2CH_2OCH_2(CF_2)_9HCF_2$$
$$HCF_2(CF_2)_9CH_2OCH_2CH_2SO_2CH_2CH_2Cl$$
$$HCF_2(CF_2)_9CH_2OCH_2CH_2SO_2CH_2CH_2OH$$
$$HCF_2(CF_2)_7CH_2OCH_2CH_2SO_2CH_2CH_2SSO_3Na$$

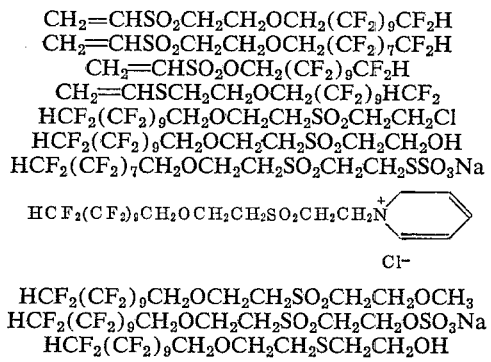

$$HCF_2(CF_2)_9CH_2OCH_2CH_2SO_2CH_2CH_2OCH_3$$
$$HCF_2(CF_2)_9CH_2OCH_2CH_2SO_2CH_2CH_2OSO_3Na$$
$$HCF_2(CF_2)_9CH_2OCH_2CH_2SCH_2CH_2OH$$

The compounds of the present invention can be prepared by various methods. The exact procedure employed will depend upon the structure of the desired product. Fluoro-alkyl vinyl sulfonyl compounds represented by the formula:

$$R_fCH_2OCH_2CH_2SO_2CH=CH_2$$

wherein $R_f$ has the same meaning as previously defined above, can be prepared by reacting divinyl sulfone with hydroxyl-containing fluorine compounds.

The hydroxyl-containing fluorine compounds that can be employed to produce the novel compounds of the present invention include, for example, fluoro-alcohols and glycols represented by the formulae $$CF_3(CF_2)_mCH_2OH$$
$$HCF_2(CF_2)_mCH_2OH$$

and $$HOCH_2(CF_2)_mCH_2OH$$

where $m$ is an integer with a value of 2 to 13.

In carrying out the reaction a large excess of divinyl sulfone is desirable. Thus, in order to obtain a good yield of the monoaddition product, an excess of divinyl sulfone of approximately 10 times the stoichiometric amount is used and the fluoro-alcohol is added slowly to the divinyl sulfone during the course of the reaction. The reaction temperature is not critical, however, it is preferably held in the range of about 80 to 130° C. in order for the reaction to proceed at a reasonable rate. It is desirable to employ as the reaction medium a suitable organic solvent that is inert to the reactants and to the products of the reaction. The reaction is carried out in the presence of a catalytic quantity of an alkaline catalyst, which is preferably the appropriate metal fluoro alcoholate. Although, other basic catalysts such as alkali metal alkoxides, alkali carbonates, quaternary ammonium hydroxides, and tertiary amines can be used, it is preferable that the catalysts employed do not react with the activated vinyl group present in the divinyl sulfone and the fluoro-vinyl sulfonyl derivative produced. Sodium carbonate, potassium carbonate, trimethylammonium hydroxide, triethylamine and pyridine have been found satisfactory catalysts for this purpose.

In addition to the above described method of preparation, the novel compounds of the present invention can be prepared by one of the following reactions:

The compounds may be prepared by reacting a suitable fluoro-alkyl ester or halide with mercaptoethanol to produce the corresponding sulfide:

(1) $R_fCH_2O(CH_2)_nX+HSCH_2CH_2OH\rightarrow$
$$R_fCH_2O(CH_2)_nSCH_2CH_2OH$$

The sulfide may be directly oxidized to the sulfone which is then converted to the halide derivative:

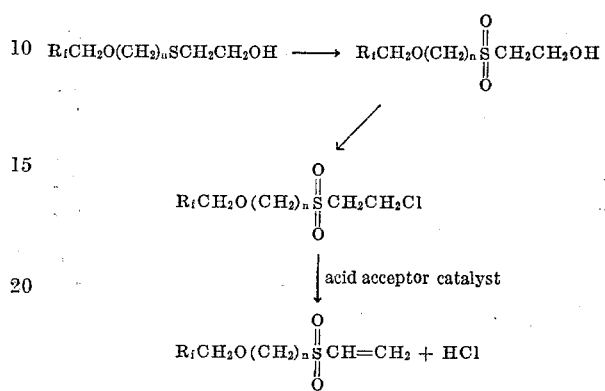

wherein $R_f$ is a fluoro alkyl group containing 3–14 carbon atoms, where the hydrogen atoms of at least two carbon atoms in said group are completely substituted by fluorine, $n$ has an integer value of 1 to 2 and X is the ester forming residue derived from an inorganic acid such as halogen acid or from an organic sulfonic acid such as toluene sulfonic, methane sulfonic and the like.

The sulfide shown as the product of Equation 1 can also be obtained by reacting a fluoro alkyl mercaptan with alkylene halohydrin or alkylene oxide as shown below in Equation 2.

(2) $R_fCH_2O(CH_2)_nSH+XCH_2CH_2OH\rightarrow$
$$R_fCH_2O(CH_2)_nSCH_2CH_2OH$$

or

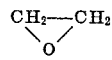

This product is then converted to the vinyl sulfone by the methods illustrated above.

The addition of acetylenic compounds to fluoroalkyl mercaptan can also be employed to produce the compounds of the present invention as shown in Equation 3.

(3)
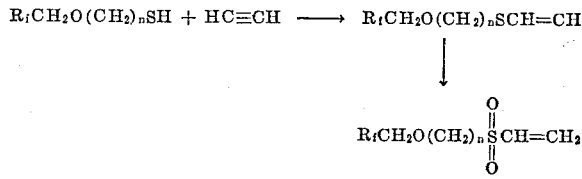

wherein $R_f$, $n$ and X have the meanings as previously defined above.

Still another preparative procedure is shown in Equation 4.

(4) $R_fCH_2O(CH_2)_nSO_2Z+RM_gZ\rightarrow$
$$R_fCH_2O(CH_2)_nSO_2R$$

in which $R_f$ and $n$ have the meanings set forth above, Z is halogen and R is $-CH=CH_2$, or $-CH_2CH_2OR'$ ($R'$ is lower alkyl).

Saturated derivatives of the fluoro-alkyl vinyl sulfonyl compounds of Formula II and which can be represented by the formula:

$$R_fCH_2O(CH_2)_nSO_2CH_2CH_2Y$$

wherein $R_f$, $n$ and Y have the meanings previously ascribed to them above, can be prepared from any one of the following compounds:

(a) $R_fCH_2O(CH_2)_nSO_2CH=CH_2$
(b) $R_fCH_2O(CH_2)_nSO_2CH_2CH_2OH$
and
(c) $R_fCH_2O(CH_2)_nSO_2CH_2CH_2X$ wherein X is halogen. The preparation of the compounds, a, b and c has been discussed above.

The saturated compounds can be prepared by one of the methods illustrated in the following equations:

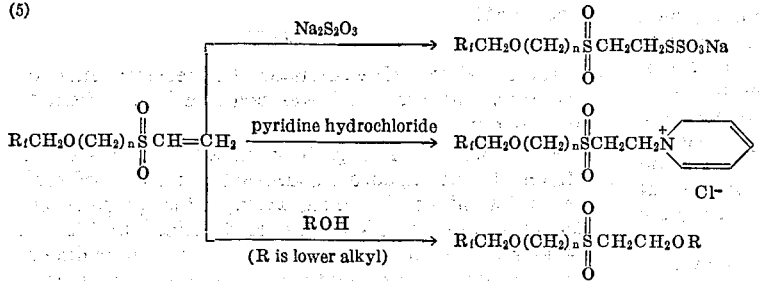

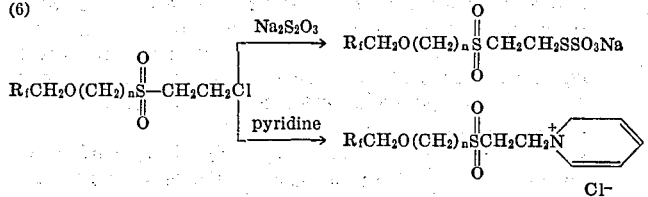

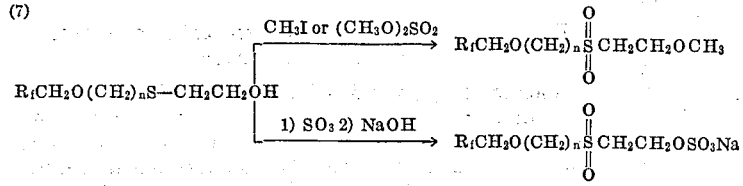

wherein $R_f$, R, and n have the same meanings as given above.

Further examples of compounds which are included in Formula II are fluoro-ethylene sulfonyl compounds, represented by the generic formula:

$$R_fCH_2OSO_2CH=CH_2$$

wherein $R_f$ has the same meaning as given above. These compounds can be prepared by reacting a 2-halogeno-ethane sulfonyl halide or an ethylene sulfonyl halide with the appropriate fluoro alcohol.

In these reactions employing sulfonyl halides approximately equimolar quantities of the fluoro alcohol and the sulfonyl halide can be used, however, the proportions are capable of variation. In some cases, the use of excess quantities of sulfonyl halide facilitates the separation of the final product. Two mols of the acid acceptor compound are required for each mol of 2-halo ethane sulfonyl halide or one mol for each mol of ethylene sulfonyl halide which is employed in the reaction. An acid acceptor compound, preferably in excess of the acid compound, is customarily employed in carrying out the reaction. Suitable acid acceptor compounds are tertiary amines such as triethyl amine, pyridine, or alkali metal carbonates such as sodium and potassium carbonate. It is desirable to employ as the reaction medium, an organic solvent which should be inert to both the reactants and the products of the reaction. For such purposes ethers such as diethyl ether, ethylene glycol dimethyl ether dioxane and tetrahydro furan are preferred. The reaction is carried out at temperatures ranging from about −70 to +50° C. but the low temperature range of −30 to −70° C. is preferred.

As an alternative method the fluorinated ethylene sulfonyl compounds can be prepared by reaction of vinyl sulfonic acid with a fluoro alcohol under suitable process conditions.

The saturated adduct compounds of the general formula $$R_fCH_2OSO_2CH_2CH_2Y$$

wherein $R_f$ and Y have the meanings ascribed to them above can generally be prepared by the methods previously outlined. In addition, these adduct compounds can be prepared by one of the following reactions employed fluoro alcohols:

$YCH_2CH_2SO_2X + R_fCH_2OH \rightarrow R_fCH_2OSO_2CH_2CH_2Y$
$YCH_2CH_2SO_3H + R_fCH_2OH \rightarrow R_fCH_2OSO_2CH_2CH_2Y$ wherein $R_f$ has the meaning given previously and Y is alkoxy, halogen or $N(R)_2$, where R is a lower alkyl radical and X is halogen. Where a sulfonyl halide is used, acid is liberated in the course of the reaction and it is necessary to employ at least one equivalent of acid acceptor compound as discussed above.

The compounds of the present invention, as can be seen from the formulae set forth above are characterized by the presence of a fluoroalkyl moiety and a sulfur containing moiety linked to a reactive group which may be a vinyl structure or a saturated derivative thereof. The reactive group present in the compounds of the present invention is capable of reacting, under suitable conditions, with Zerewitinov active hydrogen atoms including active hydrogen in the form of hydroxyl, mercapto, amino, groups and the like. Because of their reactivity, the present compounds are useful as intermediates for the preparation of various derivatives and for the modification of active hydrogen-containing polymers. Moreover, under specific conditions, the vinyl group is capable of polymerization to form homopolymers or copolymers with one or more co-polymerizable ethylenically unsaturated monomers.

The stable an inert fluorocarbon moiety contained in the molecule of the present compounds largely contributes to the importance of these compounds for the modification of polymeric materials. The physico-chemical properties of the active hydrogen-containing polymers are modified when treated with the novel compounds of this invention. For example, the organic fluorine-containing compounds can impart both water repellency and oil repellency to polymers and surfaces treated with them either by formation of covalent bonds with the polymer chain, or by coating.

Included among the polymers containing active hydrogen that can be treated with solutions of the organic fluoroalkyl sulfur-containing compounds of the present invention to impart desirable properties thereto are cellulosics (cotton, regenerated cellulose, jute) polyvinyl alcohol, starch, gelatin, keratin fibers and the like. The polymeric materials may be used in the form of solution, film, fiber or yarn fabrics. When these materials are treated with the fluoro-alkyl sulfur-containing compounds of Formulae I, II and III under the proper conditions the polymeric material can be rendered both hydrophobic and oleophobic. In the case of textiles containing polymeric material modified according to this invention, water and oil repellency properties will be obtained that are not easily removed by repeated launderings and by heavy use in service.

In actual operation; the process is carried out by contacting the polymeric material by any conventional means such as padding, dipping, or impregnating and the like with a solution of the fluoro-alkylsulfur-containing compound in an appropriate solvent, in the presence of a catalyst. Alkaline catalysts such as sodium or potassium hydroxide, carbonate or bicarbonate are used when it is desired to react the new compound with polymers. Generally, from 1 to 10% by weight of catalyst is employed, but these proportions can be varied. Other catalysts, such as peroxide and other free radical initiators, are preferred for processes in which the new compounds are caused to form polymers and copolymers either in bulk or on the surface of other materials. The catalyst can be applied after the polymeric material is contacted with the reagent. When textiles are treated, drying can be interposed between applications of reagent and catalyst, if desired. Curing may be carried out at temperatures of about 120° to 170° C. for about 2 to 10 minutes, although these ranges can be varied.

The solvent which is employed as a carrier for the fluoro-alkyl compound can be any one of a number of conventional solvents such as water, alcohol or ether. The concentration of the reagent in the carrier can be varied over a considerable range. Similarly, any suitable catalyst can be employed and the reaction temperature may be varied over a relatively wide range.

The following examples are illustrative of the present invention and are not considered as limitations thereof.

Example I.—2-(1H,1H,11H-eicosafluoro-1-undecyloxy) ethyl vinyl sulfone

A solution of 2 ml. of 4.36 molar sodium methoxide in methanol and 106.4 g. (0.20 mole) of 1H,1H,11H-eicosafluoro-1-undecanol in 100 ml. of 1,2-dimethoxyethane was slowly added with stirring to 236.4 g. (2.00 moles) of divinyl sulfone at 25° C. When about half of the addition was complete, an additional 3.0 ml. of sodium methoxide solution was added to bring the pH of the mixture to 8. When the addition was completed, the temperature of the mixture was then slowly raised to 90° C. over a five hour period. Sodium (0.6 g., 0.026 mole) was then added and the mixture was refluxed for 10 hours. An additional 1.0 g. (0.045 mole) of sodium was added and the mixture was refluxed for 5 more hours. The reaction mixture was then neutralized with acetic acid and poured into a liter of water. The solid was separated by filtration, washed repeatedly with water and air dried. Recrystallization from carbon tetrachloride yielded some unsoluble polymeric material and 103.1 g. (79.3% of theory) of $$CH_2=CHSO_2CH_2CH_2OCH_2(CF_2)_9CF_2H$$

M.P. 76.0–79.0° C. An elemental analysis of 5.23% sulfur was obtained; calculated value for $C_{15}H_{10}F_{20}O_3S$ is 4.92% sulfur.

The product was analyzed for unsaturation by dissolving 0.5 g. in 20 ml. of isopropanol, adding accurately 25 ml. of a 0.17 N solution of n-dodecyl mercaptan in isopropyl (99%), followed by addition of 2 ml. of 0.5 N potassium hydroxide in ethanol. The mixture was allowed to stand for one hour and then 125 ml. of 0.194 N hydrochloric acid in isopropanol was added. A blank was run concurrently. The amount of mercaptan consumed was determined by titration with 0.125 N bromate-iodide solution. This procedure indicated a molecular weight of 676 (theory 650).

Example II

The 2-(1H,1H,11H-eicosafluoro-1-undecyloxy)ethyl vinyl sulfone of Example I was prepared by an alternate method in the following manner:

A solution of 212.8 g. (0.40 mole) of recrystallized 1H,1H,11H-eicosafluoro-1-undecanol and 3.0 g. of sodium in 300 ml. of bis(2-methoxyethyl)ether prepared under anhydrous conditions was slowly added to 472.8 g. (4.00 moles) of divinyl sulfone at 115° C. An additional 3.0 g. of sodium was added during the course of the addition to maintain a slightly basic pH. Refluxing was continued for 56 hours. The mixture was then filtered and the filtrate was added to 2.5 liters of water. The supernatant liquid was decanted from the solid which formed. After washing thoroughly with water the solid was dried and recrystallized from chloroform yielding 125 gms. (19.2% yield) of $CH_2=CHSO_2CH_2CH_2OCH_2(CF_2)_9CF_2H$ melting at 75–77° C. Vinyl analysis of the product gave an equivalent weight of 659 (theory 650).

Example III.—2-(1H,1H,9H-hexadecafluoro-1-nonanoxy)ethyl vinyl sulfone

Sodium (1.5 g.) was dissolved in 20 ml. of methanol and this solution was added to a solution of 172.8 g. (0.40 mole) of 1H, 1H, 9H-hexadecafluoro-1-nonanol in 400 ml. of 1,2-dimethoxyethane. This mixture was then slowly distilled until about 200 ml. of distillate had been obtained. The residue from the distillation was then slowly added to 472.8 g. of stirred divinyl sulfone at 104° C. over a three hour period. The mixture was heated at 110° C. for 8.5 hours. After filtration, the filtrate was poured into water and the organic phase was separated and dissolved in ether. The aqueous phase was extracted with ether and the combined ether solutions were dried over sodium sulfate and stripped by heating to 125.5° C. at 1.3 mm. a crude yield of 171.9 g. of $$CH_2=CHSO_2CH_2CH_2OCH_2(CF_2)CF_2H$$

(78% of theory), was obtained.

A vinyl determination carried out as described in Example I showed the equivalent weight to be 467 (theory 550). This material was distilled to give 71.1 g. of product (32.3% of theory) B.P. 164–172° C./0.8 mm. before the remainder of the material decomposed. Vinyl analysis of the distillate showed it to have an equivalent weight of 583 (theory 550).

Example IV

The 2-(1H,1H,9H-hexafluoro-1-nonanoxy)ethyl vinyl sulfone of Example III was prepared in an alternative procedure in the following manner:

A solution of 216.1 g. (0.50 mole) of recrystallized 1H,1H,9H-hexadecafluoro-1-nonanol and 8 gms. of sodium in 400 ml. of 1,2-dimethoxy ethane prepared under anhydrous conditions was added dropwise to 590.5 gms. (5.0 moles) of divinyl sulfone at 115° C. maintaining a slight alkalinity. Refluxing was continued for 33 hours and the mixture was then filtered. The filtrate was added to three liters of water and the crude, water insoluble product was washed with water until a satisfactory analysis was obtained.

Example V.—1H,1H,11H-eicosafluoro-1-decyl ethylenesulfonate

A solution of 26.6 g. (0.05 mole) of 1H,1H,11H-eicosafluoro-1-undecanol and 10.1 g. (0.10 mole) of triethyl amine in 80 ml. of 1,2-dimethoxyethane (Ansul 121) was slowly added with stirring to a solution of 8.15 g. (0.05 mole) 2-chloroethanesulfonyl chloride and 0.2 g. of hydroquinone in 20 ml. of 1,2-dimethoxy ethane at $-30°$ C. The temperature of the mixture was allowed to slowly rise to ambient and the mixture filtered. The residue obtained by stripping the filtrate was recrystallized from chloroform to yield $$CH_2=CHSO_2OCH_2(CF_2)_9CF_2H$$

melting at 77.0–78.0° C. Vinyl analysis carried out by the procedure described in Example I gave an equivalent weight of 735 (theory 622.19) and a sulfur analysis of 3.48% (theory 5.15%).

Example VI

A sample of a plain weave cotton fabric (commonly known as 80 x 80 print cloth) was inpregnated with an 18.8% solution of the product of Example I in methanol, using a laboratory padder and setting the rolls at such a pressure as to give a 70% wet pickup. The fabric sample so treated, containing 0.13 g. of reagent per gram of fabric, was framed and dried in a forced draft oven at 90° C. then treated by padding with a 2.0% aqueous solution of sodium hydroxide, setting the rolls at such a pressure as to give a 70% wet pickup. The fabric sample so treated was framed to the original dimensions, dried at 60° C. and then cured at 150° C. for 5 minutes in a forced draft oven. The fabric sample was rinsed with a 1% acetic acid solution to neutralize residual sodium hydroxide and then washed at 50° C. The sample was framed to original dimensions and dried. The reaction yielded an 11.8% increase in fabric weight, corresponding to a 90.8% reaction yield. The water repellency of the sample was rated 50 and the oil repellency was rated 80. These values did not change after 5 launderings at 140° F. in a home type washing machine. By comparison, untreated samples showed no repellency to water and oil.

The test procedure followed in this and the following Examples is identified below.

Water repellency: (Spray rating) Standard AATCC Test Method 22–1952

Oil repellency: (Spray rating) Technical Information Bulletin from 3M Co.

Example VII

Example VI was repeated, but a 2.5% sodium carbonate solution was used in place of the sodium hydroxide. The treatment resulted in a 2.46% weight increase corresponding to 18.9% reaction yield. The water repellency of the treated sample was rated 50/70 and the oil repellency was rated 70/80. After 5 launderings, the water repellency was rated 50 and the oil repellency was rated 60.

Example VIII

Example VI was repeated but no alkaline catalyst was used. The sample impregnated with the product of Example I was cured after drying without any intermediate treatment.

The procedure resulted in a 4.15% weight increase corresponding to a 31.9% reaction yield. The water repellency of the sample was rated 50 and the oil repellency was rated 80. These values did not change after 5 launderings.

Polymers and copolymers of the fluoro-alkyl sulfur-containing compounds of the present invention can also be prepared by polymerizing the desired fluoro compound in the presence of a suitable free radical catalyst, e.g. peroxide catalysts, to produce the homopolymer. If copolymers are desired the novel fluoro-alkyl sulfur-containing compounds of the present invention can be polymerized with one or more polymerizable ethylenically unsaturated compounds to yield polymeric materials with a wide range of properties. Films and sheets produced from the above polymers are characterized by toughness and flexibility making them aptly suitable for applications where such properties are important.

What is claimed is:

1. A method for modifying polymeric materials containing active hydrogen atoms in order to improve their water and oil resistance which comprises contacting the said polymeric material with a fluoro-alkyl sulfur-containing compound of the general formula $$R_fCH_2O(CH_2)_nS[O]_bQ$$

wherein

Q is selected from the group consisting of $-CH=CH_2$ and $-CH_2CH_2Y$, wherein

Y is a member selected from the group consisting of a potentially anionic nucleophilic group and a potentially neutral nucleophilic group, $R_f$ is a fluoro-alkyl group containing from 3 to 14 carbonatoms, where the hydrogen atoms of at least 2 carbon atoms in the said group are substituted completely by fluorine, $n$ is an integer with a value of from 0 to 2, and $b$ is an integer with a value of from 0 to 2, and when $n$ has a value of 0, then $b$ has a value of 2.

2. A method as defined in claim 1 wherein the polymer is cellulosic.

3. A method as defined in claim 1 wherein the polymer is polyvinyl alcohol.

4. A method as defined in claim 1 wherein the polymer is starch.

5. A method for modifying polymeric materials containing active hydrogen atoms which comprises contacting the said polymeric materials with a fluoro-alkyl β-substituted sulfonyl compound of the general formula:

$$R_fCH_2O(CH_2)_nSO_2CH_2CH_2Y$$

wherein $R_f$ is a fluoro-alkyl group containing from 3 to 14 carbon atoms where the hydrogen atoms of at least two carbon atoms in said group are completely substituted by fluorine, $n$ is an integer with a value of from 0 to 2 and Y is a member selected from the group consisting of hydroxy, lower alkoxy, $-OCOR$, $-OSO_3M$, $-SSO_3M$, $-N(R)_2$, halogen, $-\overset{+}{S}R_2Cl$ and $-(\overset{+}{N}C_5H_5)Cl-$ wherein R is a lower alkyl group and M is a member selected from the group consisting of alkali metal and ammonium.

6. A method for modifying polymeric materials containing active hydrogen atoms in order to improve their water and oil resistance which comprises contacting said polymeric material with a fluoro-alkyl vinyl sulfur-containing compound of the general formula $$R_fCH_2O(CH_2)_nS[O]_bCH=CH_2$$

wherein $R_f$ is a fluoro-alkyl group containing from 3 to 14 carbon atoms, where the hydrogen atoms of at least 2 carbon atoms in said group are completely substituted by fluorine, $n$ is an integer with a value of from 0 to 2, and $b$ is an integer with a value of from 0 to 2, and when $n$ has a value of 0 then $b$ has a value of 2.

7. The method of claim 6 wherein an alkaline catalyst is present.

8. A method of modifying cellulosic textile materials in order to improve their resistance to water and oil which comprises contacting the said cellulosic materials with a fluoro-alkyl vinyl sulfur-containing compound of the general formula $$R_fCH_2O(CH_2)_nS[O]_bCH=CH_2$$

wherein $R_f$ is a fluoro-alkyl group containing from 3 to 14 carbon atoms, where the hydrogen atoms of at least 2 carbon atoms in said group are completely substituted by fluorine, $n$ is an integer with a value of from 0 to 2 and $b$ is an integer with a value of from 0 to 2, and when $n$ has a value of 0 then $b$ has a value of 2.

9. The method of claim 8 wherein the polymeric material is cotton.

10. The method of claim 8 wherein the polymeric material is regenerated cellulose.

11. The method of claim 9 wherein the fluoro compound is 2-(1H,1H,11H-eicosafluoro-1-undecyloxy, ethyl vinyl sulfone.

12. The method of claim 9 wherein the fluoro compound is 1H,1H,11H - eicosafluoro-1-decylethylene sulfonate.

13. The method of claim 9 wherein the fluoro compound is 2-(1H,1H,9H-hexadecafluoro - 1 - nonanoxy) ethyl vinyl sulfone.

14. Hydrophobic and oleophobic cellulosic textile materials produced by the reaction of cellulose with fluoroalkyl sulfur containing compounds of the general formula $$R_fCH_2O(CH_2)_nS[O]_bQ$$

wherein

Q is selected from the group consisting of $-CH=CH_2$ and $-CH_2CH_2Y$, wherein

Y is a member selected from the group consisting of a potentially anionic nucleophilic group and a potentially neutral nucleophilic group, $R_f$ is a fluoro-alkyl group containing from 3 to 14 carbon atoms, where the hydrogen atoms of at least 2 carbon atoms in said group are completely substituted by fluorine, $n$ is an integer with a value of from 0 to 2, and $b$ is an integer with a value of from 0 to 2, and when $n$ has a value of 0, then $b$ has value of 2.

References Cited

UNITED STATES PATENTS 3,335,163   8/1967   Tesoro et al. _____ 260—456

NORMAN G. TORCHIN, *Primary Examiner.*

J. C. CANNON, *Assistant Examiner.*